(12) United States Patent
Jeong et al.

(10) Patent No.: US 9,696,768 B2
(45) Date of Patent: Jul. 4, 2017

(54) TOUCH TYPE ORGANIC LIGHT EMITTING DIODE DISPLAY DEVICE

(71) Applicant: LG DISPLAY CO., LTD., Seoul (KR)

(72) Inventors: Il-Doo Jeong, Seoul (KR); Ha-Zoong Kim, Suwon-si (KR); Hyun-Kyu Park, Goyang-si (KR); Jin-Wook Choi, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/135,068

(22) Filed: Dec. 19, 2013

(65) Prior Publication Data

US 2014/0320759 A1 Oct. 30, 2014

(30) Foreign Application Priority Data

Apr. 26, 2013 (KR) ........................ 10-2013-0046961

(51) Int. Cl.
  *G06F 1/16* (2006.01)
  *G06F 3/046* (2006.01)
  *G06F 3/041* (2006.01)

(52) U.S. Cl.
  CPC ............ *G06F 1/1692* (2013.01); *G06F 3/046* (2013.01); *G06F 3/0412* (2013.01)

(58) Field of Classification Search
  CPC ........ G06F 1/1692; G06F 3/046; G06F 3/041; G06F 3/0412; H03K 17/95; G01D 5/20; H01L 51/50; H05B 33/02
  See application file for complete search history.

(56) References Cited

U.S. PATENT DOCUMENTS

| | | | |
|---|---|---|---|
| 4,878,553 A | | 11/1989 | Yamanami et al. |
| 4,956,526 A | * | 9/1990 | Murakami et al. ........ 178/18.08 |
| 5,130,500 A | * | 7/1992 | Murakami et al. ........ 178/18.08 |
| 5,136,125 A | * | 8/1992 | Russell ...................... 178/18.07 |
| 5,657,011 A | * | 8/1997 | Komatsu et al. .................. 341/5 |
| 7,030,782 B2 | * | 4/2006 | Ely .......................... G06F 3/046 |
| | | | 178/18.07 |
| RE39,475 E | | 1/2007 | Murakami et al. |
| 7,499,034 B2 | * | 3/2009 | Shi ................................ 345/173 |
| 7,755,616 B2 | * | 7/2010 | Jung ...................... G06F 3/046 |
| | | | 345/173 |
| 2002/0179339 A1 | * | 12/2002 | Ely et al. .................... 178/18.07 |

(Continued)

FOREIGN PATENT DOCUMENTS

| | | |
|---|---|---|
| CN | 1940843 A | 4/2007 |
| JP | 01300331 A | 12/1989 |

(Continued)

OTHER PUBLICATIONS

Office Action of Chinese Patent Office in Appication No. 201310665302.6, dated Feb. 23,2017.*

*Primary Examiner* — Nalini Mummalaneni
*Assistant Examiner* — Ivelisse Martinez Quiles
(74) *Attorney, Agent, or Firm* — Dentons US LLP

(57) ABSTRACT

An organic light emitting diode display device includes a display portion including a substrate, and an organic light emitting diode on the substrate; and an electromagnetic induction sensor portion attached to a bottom of the display portion, wherein the electromagnetic induction sensor portion includes: a back plate; a protection layer covering a bottom of the back plate; and a loop antenna pattern on at least one of top and bottom surfaces of the back plate.

3 Claims, 5 Drawing Sheets

(56) References Cited

U.S. PATENT DOCUMENTS

| | | | |
|---|---|---|---|
| 2003/0206161 A1* | 11/2003 | Liu et al. | 345/173 |
| 2004/0233178 A1* | 11/2004 | Silk et al. | 345/179 |
| 2006/0146033 A1 | 7/2006 | Chen et al. | |
| 2006/0262098 A1* | 11/2006 | Okamoto | G06F 3/0488 345/173 |
| 2009/0184940 A1* | 7/2009 | Silk | G06F 1/3203 345/173 |
| 2009/0231299 A1* | 9/2009 | Shi | 345/173 |
| 2009/0315855 A1* | 12/2009 | Oikawa et al. | 345/174 |
| 2010/0265206 A1* | 10/2010 | Chen | 345/174 |
| 2010/0271323 A1* | 10/2010 | Lien et al. | 345/173 |
| 2011/0090171 A1* | 4/2011 | Chen | G06F 3/0412 345/174 |
| 2011/0227869 A1* | 9/2011 | Lai | G06F 3/046 345/173 |
| 2013/0342193 A1* | 12/2013 | Yoo et al. | 324/228 |
| 2014/0022181 A1* | 1/2014 | Bergman | G06F 3/0418 345/173 |
| 2014/0132553 A1* | 5/2014 | Park | G06F 3/0412 345/174 |

FOREIGN PATENT DOCUMENTS

| | | |
|---|---|---|
| JP | 2007048278 A | 2/2007 |
| JP | 2012-224755 A | 11/2012 |
| TW | 201039200 A | 11/2010 |
| TW | 201039304 A | 11/2010 |
| TW | 201133429 A1 * | 10/2011 |
| WO | 2011/024690 A1 | 3/2011 |

\* cited by examiner

TOUCH TYPE ORGANIC LIGHT EMITTING DIODE DISPLAY DEVICE

CROSS-REFERENCE TO RELATED APPLICATIONS

The present invention claims the benefit of Korean Patent Application No. 10-2013-0046961, filed on Apr. 26, 2013, which is hereby incorporated by reference for all purposes as if fully set forth herein.

BACKGROUND OF THE INVENTION

Field of the Invention

The present invention relates to a touch type organic light emitting diode display device. More particularly, the present invention relates to a touch type organic light emitting diode display device including an electromagnetic induction sensor portion.

Discussion of the Related Art

With the advent of an information-oriented society, the field of display device processing and displaying mass information has rapidly developed, and recently, flat display devices having excellent features such as thin profile, light weight and low power consumption as compared to CRTs.

Because an organic light emitting diode (OLED) display device, among the flat display devices, is self-luminescent, the OLED display device has a viewing angle, contrast, etc. better than a liquid crystal display device. Further, the OLED display device does not require a backlight and thus can have a lighter weight and low power consumption. The OLED display device can be operated with direct low voltage, and have rapid response time. Further, because the OLED display device is all made of solid materials, the OLED display device is strong to an external impact, and has a wide range of operation temperature, and production cost is low.

A touch type display device is widely used that can input user's instruction by selecting a screen using user's hand or object.

To do this, the touch type display device includes a touch panel on the front thereof and converts a position touched by the user's hand or object into an electric signal. Accordingly, an information of instruction selected at the touched position is supplied as an input signal.

The touch panel is categorized into a resistive type, a photo sensor type, and a capacitive type. Particularly, the resistive and capacitive types are mostly used for electronic organizers, PDAs, portable PCs and mobile phones.

FIG. 1 is a cross-sectional view illustrating a touch type OLED display device according to the related art.

As shown in FIG. 1, the touch type OLED display device includes a display portion 110 and an electromagnetic induction sensor portion 120.

The display portion 110 functions to display images, and includes an organic light emitting diode E, a thin film transistor T, a glass substrate 10, a sealant 30, a polarizing plate 40, a first adhesive layer 50, a cover glass 60, a passivation layer 20, and a bank layer 25.

The thin film transistor T is formed on the glass substrate 10, and the organic light emitting diode E is connected to the thin film transistor T and emits light according to a signal applied to the thin film transistor T.

The sealant 30 is located on the organic light emitting diode E and functions to prevent the organic light emitting diode E from being exposed to moisture and oxygen.

The polarizing plate 40 is formed on the sealant 30, and functions to transmit light having a polarizing component equal to a polarizing axis thereof and absorb or reflect other light and thus produce light polarized in the specific direction.

The electromagnetic induction sensor portion 120 includes a first protection film 80a, a printed circuit board 70, a second protection film 80b, and a loop antenna receiving a signal applied from the outside is formed in the printed circuit board 70.

The electromagnetic induction sensor portion 120 is attached to the display portion 110 using a second adhesive layer 90.

The electromagnetic induction sensor portion 120 has a thickness of about 700 um because of the thin films constituting it.

As described above, the thickness of the touch type OLED display device increases because of the thick electromagnetic induction sensor portion 120.

SUMMARY OF THE INVENTION

Accordingly, the present invention is directed to a touch type OLED display device which substantially obviates one or more of the problems due to limitations and disadvantages of the related art.

An advantage of the present invention is to provide a touch type OLED display device having a reduced thickness and reduced production costs.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, an organic light emitting diode display device includes a display portion including a substrate, and an organic light emitting diode on the substrate; and an electromagnetic induction sensor portion attached to a bottom of the display portion, wherein the electromagnetic induction sensor portion includes: a back plate; a protection layer covering a bottom of the back plate; and a loop antenna pattern on at least one of both surfaces of the back plate.

In another aspect, an organic light emitting diode display device includes a display portion including a substrate, and an organic light emitting diode on the substrate; and an electromagnetic induction sensor portion attached to a bottom of the display portion, wherein the electromagnetic induction sensor portion is a flexible printed circuit board including a loop antenna.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
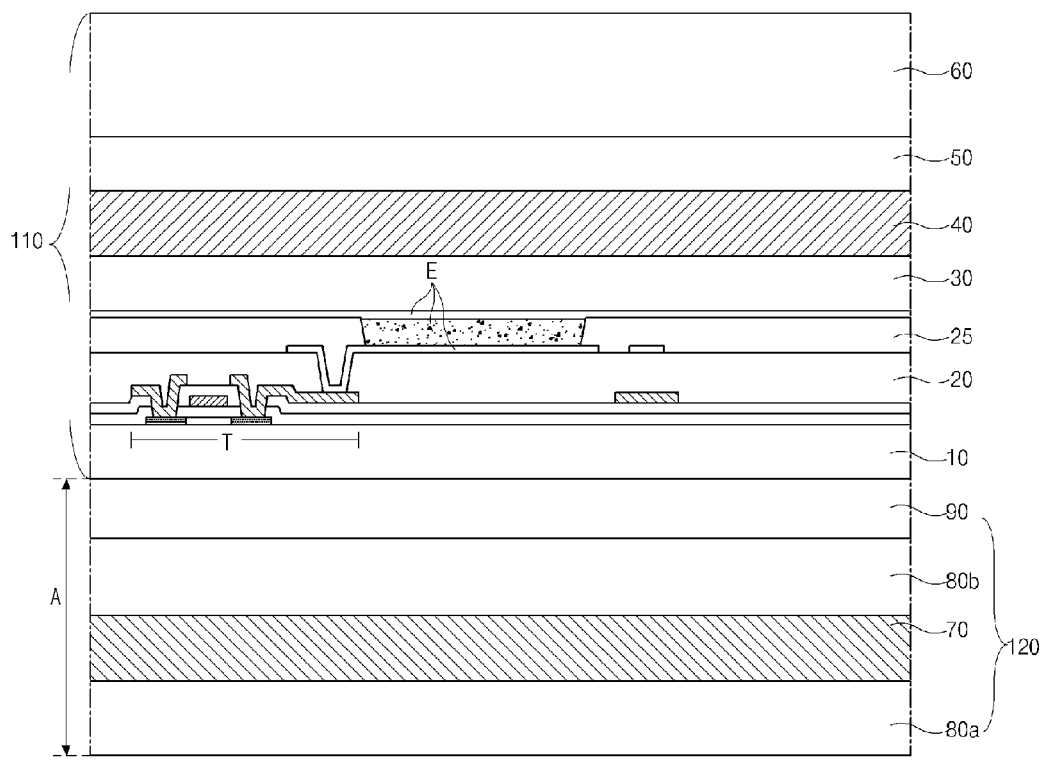
FIG. 1 is a cross-sectional view illustrating a touch type OLED display device according to the related art.
Figure 2:
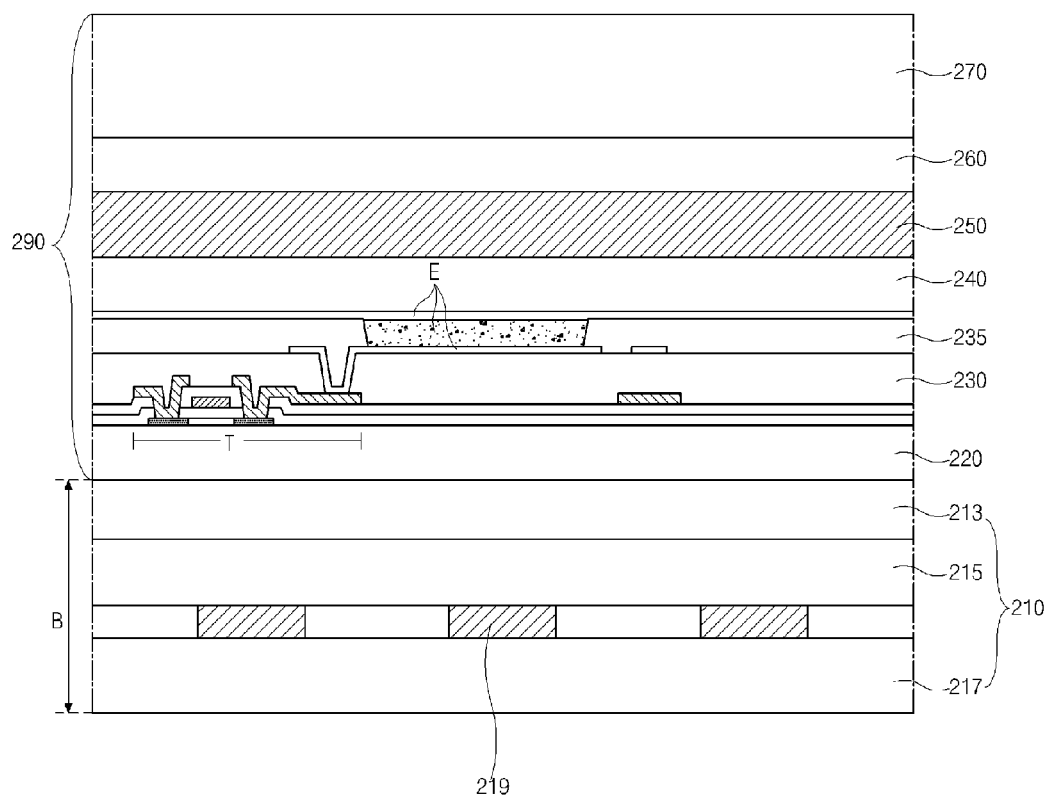
FIG. 2 is a schematic cross-sectional view illustrating a touch type OLED display device according to a first embodiment of the present invention.

FIG. 2 is a schematic cross-sectional view illustrating a touch type OLED display device according to a first embodiment of the present invention.

Referring to FIG. 2, the touch type OLED display device 200 includes a display portion 290 and an electromagnetic induction sensor portion 210.

The display portion 290 displays images and includes an organic light emitting diode E, a thin film transistor T, a substrate 220, a passivation layer 230, a bank layer 235, a sealant 240, a polarizing plate 250, a first adhesive layer 260 and a cover glass 270.

The thin film transistor T is formed on the substrate 220, and the organic light emitting diode E is connected to the thin film transistor T and emits light according to a signal applied to the thin film transistor T.

The substrate 220 may be formed of a material having a flexible property, for example, polyimide, and in this case, the substrate 220 can have flexible properties.

The passivation layer 230 is formed between the organic light emitting diode E and the thin film transistor T to protect the thin film transistor T.

The bank layer 235 is formed on the passivation layer 230 surrounding an organic light emitting layer of the organic light emitting diode E.

The sealant 240 is formed on the organic light emitting diode E and functions to prevent the organic light emitting diode E from being exposed to moisture and oxygen.

The polarizing plate 250 is formed on the sealant 240, and functions to transmit light having a polarizing component equal to a polarizing axis thereof and absorb or reflect other light and thus produce light polarized in the specific direction.

The electromagnetic induction sensor portion 210 includes a second adhesive layer 213, a back plate 215, a protection layer 217, and a loop antenna pattern 219 below the back plate 215 receiving a signal applied from the outside.

The loop antenna pattern 219 functions to receive an electromagnetic signal output from an electromagnetic pen and extracts a coordinate of position.

The loop antenna pattern 219 may include, for example, a first metal pattern on the bottom surface of the back plate 215.

The first metal pattern has a loop antenna shape in plan view and functions as a receiver.

By using the first metal pattern, the electromagnetic signal can be received and the coordinate at which the signal is received can be extracted.

The back plate 215 may be made of a material having flexible property, for example, polyester, and in this case, the back plate 215 may have a flexible property like the substrate 220.

The electromagnetic induction sensor portion 210 is attached to the display portion 290 using the second adhesive layer 213.

The loop antenna pattern 219 may be formed by a method of depositing a metal on a surface of the back plate 215 and then etching the metal, or a printing method.

When the substrate 220 is made of polyimide, the substrate 220 is as thin as about 5 um and thus is prone to be torn, and to remedy this weakness, the back plate 215 is attached to the substrate 220.

The protection layer 217 may entirely cover the loop antenna pattern 219 and the back plate 215 to protect a bottom portion of the electromagnetic induction sensor portion 210.

When the electromagnetic induction sensor portion 210 is formed as above, a thickness B thereof can be as small as about 100 um to about 200 um.

Even though not shown in the drawings, the coordinate extracted by the loop antenna pattern 219 is transferred to a flexible printed circuit.

The loop antenna pattern 219 may be formed on the back plate 215, which is explained with reference to FIG. 3.

Figure 3:
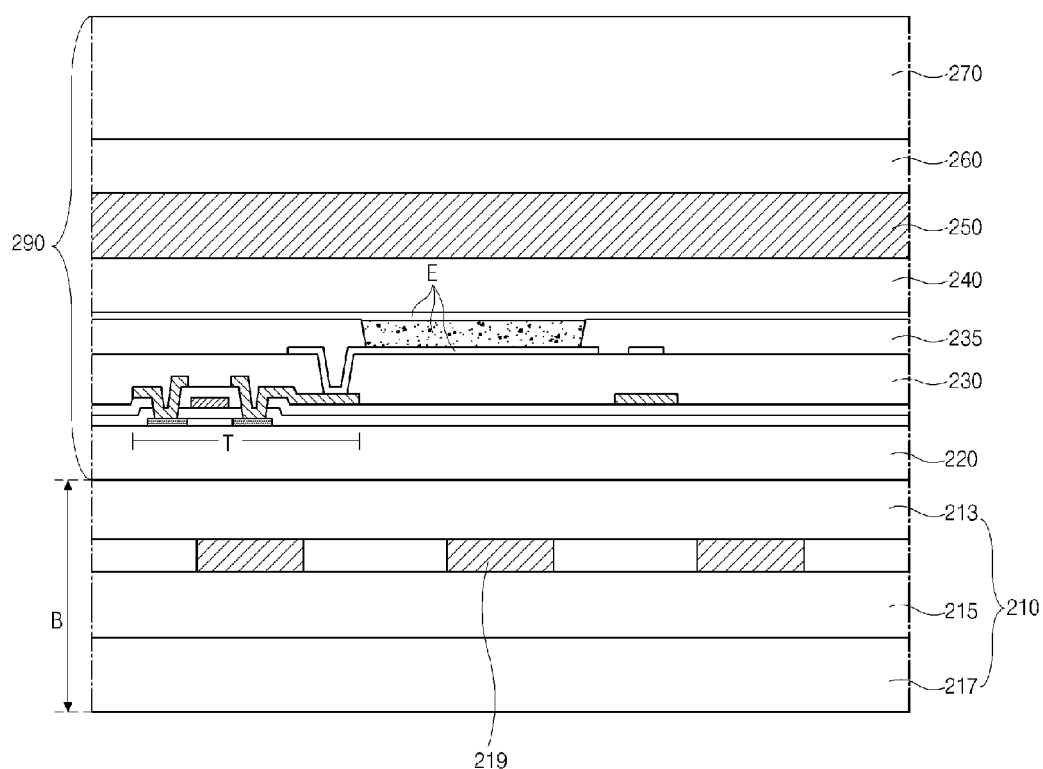
FIG. 3 is a schematic cross-sectional view illustrating a touch type OLED display device according to a second embodiment of the present invention.

FIG. 3 is a schematic cross-sectional view illustrating a touch type OLED display device according to a second embodiment of the present invention. Explanations of parts similar to parts of the first embodiment may be omitted.

Referring to FIG. 3, the touch type OLED display device 200 includes a display portion 290 and an electromagnetic induction sensor portion 210.

The display portion 290 to display images includes an organic light emitting diode E, a thin film transistor T, a substrate 220, a passivation layer 230, a bank layer 235, a sealant 240, a polarizing plate 250, a first adhesive layer 260 and a cover glass 270.

The electromagnetic induction sensor portion 210 includes a second adhesive layer 213, a back plate 215, a protection layer 217, and a loop antenna pattern 219 on the back plate 215 receiving a signal applied from the outside.

The loop antenna pattern 219 may be formed by a method of depositing a metal on a top surface of the back plate 215 and then etching the metal, or a printing method.

The loop antenna pattern 219 functions to receive an electromagnetic signal output from an electromagnetic pen and extracts a coordinate of position.

The loop antenna pattern 219 may include, for example, a second metal pattern on the top surface of the back plate 215.

The second metal pattern has a loop antenna shape in plan view and functions as a receiver.

By using the second metal pattern, the electromagnetic signal can be received and the coordinate at which the signal is received can be extracted.

The back plate 215 may be made of a material having flexible properties, for example, polyester. In this case, the back plate 215 may have a flexible property like the substrate 220.

The electromagnetic induction sensor portion 210 is attached to the display portion 290 using the second adhesive layer 213.

When the substrate 220 is made of polyimide, the substrate 220 is as thin as about 5 um and thus is prone to be torn. To remedy this weakness, the back plate 215 is attached to the substrate 220.

The protection layer 217 is formed below the back plate 215 to protect a bottom portion of the electromagnetic induction sensor portion 210.

When the electromagnetic induction sensor portion 210 is formed as above, a thickness B thereof can be as small as about 100 um to about 200 um.

The loop antenna pattern 219 may be formed at both surfaces of the back plate 215, which is explained with reference to FIG. 4.

Figure 4:
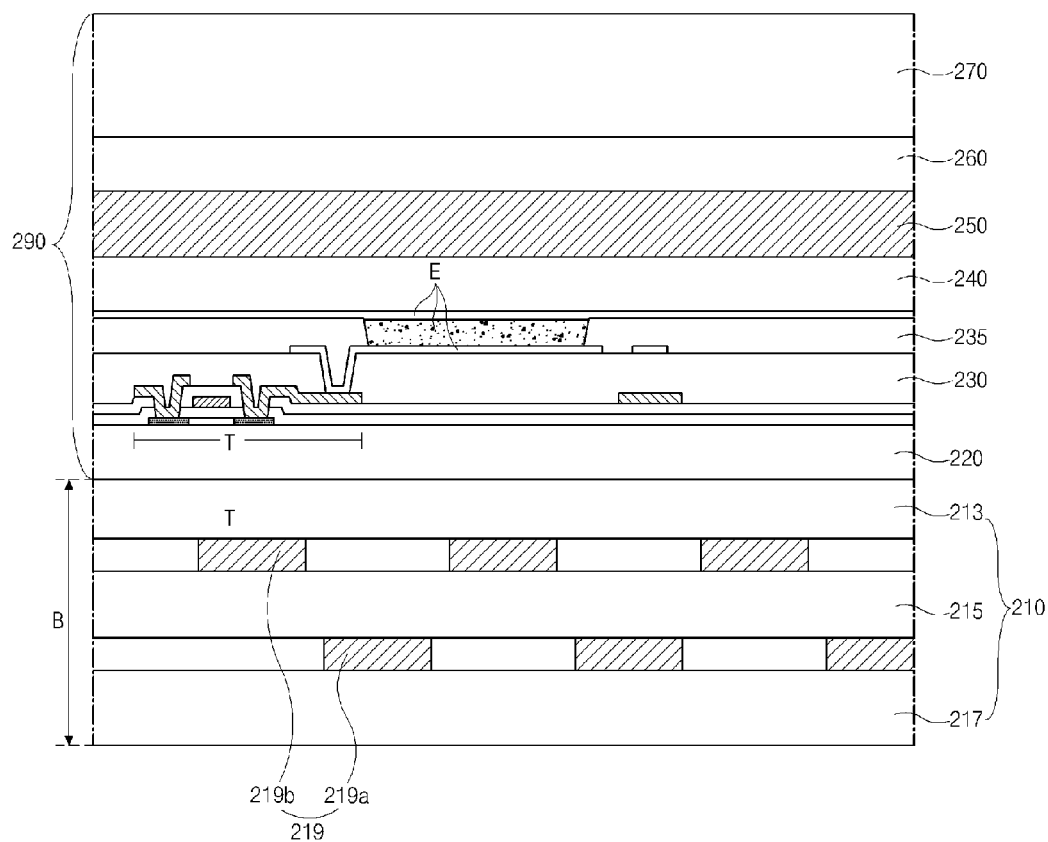
FIG. 4 is a schematic cross-sectional view illustrating a touch type OLED display device according to a third embodiment of the present invention.

FIG. 4 is a schematic cross-sectional view illustrating a touch type OLED display device according to a third embodiment of the present invention. Explanations of parts similar to parts of the first and second embodiments may be omitted.

Referring to FIG. 4, the touch type OLED display device 200 includes a display portion 290 and an electromagnetic induction sensor portion 210.

The display portion 290 to display images includes an organic light emitting diode E, a thin film transistor T, a substrate 220, a passivation layer 230, a bank layer 235, a sealant 240, a polarizing plate 250, a first adhesive layer 260 and a cover glass 270.

The electromagnetic induction sensor portion 210 includes a second adhesive layer 213, a back plate 215, a protection layer 217, and a loop antenna pattern 219 on a top surface and a bottom surface of the back plate 215 receiving a signal applied from the outside.

The loop antenna pattern 219 may be formed by a method of depositing a metal on both surfaces top and bottom of the back plate 215 and then etching the metal, or a printing method.

The loop antenna pattern 219 functions to receive an electromagnetic signal output from an electromagnetic pen and extracts a coordinate of position.

The loop antenna pattern 219 may include, for example, a first metal pattern 219a on one of the top and bottom surfaces, and a second metal pattern 219b on the other of the top and bottom surfaces.

The first and second metal patterns 219a and 219b are not limited to the above configuration, and may have other configuration.

The first and second metal patterns 219a and 219b each have a loop antenna shape in plan view and function as a receiver.

By using the first and second metal patterns 219a and 219b, the electromagnetic signal can be received and the coordinate at which the signal is received can be extracted.

As such, the loop antenna pattern 219 is formed on both the top and bottom surfaces of the back plate 215, thus has loop antenna more than the loop antenna pattern formed on one of the top and bottom surfaces of the back plate 215. Accordingly, electromagnetic sensitivity can be improved.

The back plate 215 may be made of a material having flexible properties, for example, polyester. In this case, the back plate 215 may have a flexible property like the substrate 220.

The electromagnetic induction sensor portion 210 is attached to the display portion 290 using the second adhesive layer 213.

When the substrate 220 is made of polyimide, the substrate 220 is as thin as about 5 um and thus is prone to be torn. To remedy this weakness, the back plate 215 is attached to the substrate 220.

The protection layer 217 is formed below the back plate 215 to protect a bottom portion of the electromagnetic induction sensor portion 210.

When the electromagnetic induction sensor portion 210 is formed as above, a thickness B thereof can be as small as about 100 um to about 200 um.

In the embodiments described above, the antenna loop pattern is formed on one or both surfaces of the back plate 215, and thus the thickness of the electromagnetic induction sensor 210 can be reduced.

Further, the problem of tearing of the thin substrate made of polyimide can be prevented by using the back plate 215 of the electromagnetic induction sensor portion 210.

The electromagnetic induction sensor portion 210 may be formed as a flexible printed circuit board, which is explained with reference to FIG. 5.

Figure 5:
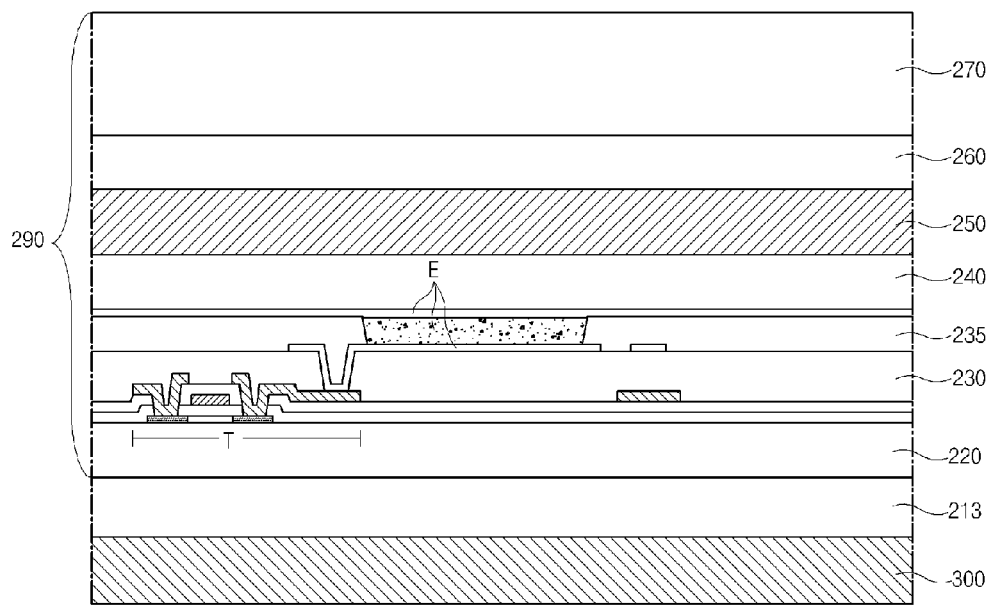
FIG. 5 is a schematic cross-sectional view illustrating a touch type OLED display device according to a fourth embodiment of the present invention.

FIG. 5 is a schematic cross-sectional view illustrating a touch type OLED display device according to a fourth embodiment of the present invention. Explanations of parts similar to parts of the first to third embodiments may be omitted.

Referring to FIG. 5, the touch type OLED display device 200 includes a display portion 290 and a sensing flexible printed circuit board (PCB) 300.

The display portion 290 to display images includes an organic light emitting diode E, a thin film transistor T, a substrate 220, a passivation layer 230, a bank layer 235, a sealant 240, a polarizing plate 250, a first adhesive layer 260 and a cover glass 270.

The sensing flexible PCB 300 functions to receive an electromagnetic signal output from an electromagnetic pen and extracts a coordinate of position.

The sensing flexible PCB 300 is attached to the display portion 290 using the second adhesive layer 213.

Even though not shown in the drawings, the sensing flexible PCB 300 include a base film, signal lines, a plating layer, and an insulating layer sequentially located from a bottom to a top.

A loop antenna receiving an electromagnetic signal from the outside is formed on the base film.

When the substrate 220 is made of polyimide, the substrate 220 is as thin as about 5 um and thus is prone to be torn, and to remedy this weakness, the sensing flexible PCB 300 entirely covers and is attached to the substrate 220.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An organic light emitting diode display device comprising:
    a display portion including a substrate, an organic light emitting diode on a top surface of the substrate, and a polarizing plate on the organic light emitting diode and on the top surface of the substrate; and
    an electromagnetic induction sensor portion attached to a bottom surface of the substrate, wherein the electromagnetic induction sensor portion is farther from a user's side of the organic light emitting diode display than the display portion, and
    wherein the electromagnetic induction sensor portion includes:
    a flexible back plate made of a polyester and attached to the substrate, wherein the substrate is a flexible substrate made of a polyimide and has a thickness of about 5 μm, and wherein the flexible back plate supports the flexible substrate to prevent tearing thereof;

a protection layer covering a bottom of the back plate; and a disjunctive loop antenna pattern arranged on a same single layer directly on and physically contacting the back plate, wherein the disjunctive loop antenna pattern is on only one of top and bottom surfaces of the back plate, and wherein a thickness of the electromagnetic induction sensor portion is between 100 to 200 μm.

2. The device according to claim 1, wherein the disjunctive loop antenna pattern includes a metal pattern directly on the bottom surface of the back plate.

3. The device according to claim 1, wherein the disjunctive loop antenna pattern includes a metal pattern directly on the top surface of the back plate.

* * * * *